United States Patent [19]

Ball

[11] 4,086,810
[45] May 2, 1978

[54] AIRCRAFT INSTRUMENT

[76] Inventor: Richard Harding Ball, 2140 Kohler Dr., Boulder, Colo. 80303

[21] Appl. No.: 725,385

[22] Filed: Sep. 22, 1976

[51] Int. Cl.² ............................................. G01C 21/10
[52] U.S. Cl. ......................................... 73/179; 73/384
[58] Field of Search ...................... 73/179, 178 T, 384, 73/178 R; 244/180, 181, 182, 183, 186, 187; 235/150.2

[56] References Cited

U.S. PATENT DOCUMENTS

| 3,451,265 | 6/1969 | Ball | 73/179 |
|---|---|---|---|
| 3,769,827 | 11/1973 | Moore | 73/179 |
| 3,789,661 | 2/1974 | Melsheimer | 73/179 |

Primary Examiner—Donald O. Woodiel
Attorney, Agent, or Firm—Burton & Dorr

[57] ABSTRACT

An aircraft instrument responsive to altitude and airspeed change. The instrument includes a first pressure transducer responsive to the pressure change due to changes in the altitude of the aircraft and a second pressure transducer responsive to pressure change due to changes in the airspeed of the aircraft. The output of each transducer is amplified and uniquely combined to provide an electrical signal representative of the rate of climb of the aircraft. The instrument also optionally modifies the airspeed transducer output and combines the modified signal with the rate of climb signal to provide a signal representative of the vertical movement of air outside of the aircraft. Additionally, the instrument may optionally provide an indication whenever best speed to fly conditions exist. Finally, the instrument also optionally modifies the airspeed transducer output and combines the modified signal with the rate of climb signal to render the rate of climb signal insensitive to climb induced by operation of the aircraft controls.

19 Claims, 8 Drawing Figures

Fig.-8

AIRCRAFT INSTRUMENT

BACKGROUND OF THE INVENTION

1. Field of the Invention

This invention relates to an aircraft instrument for generating rate of climb information and more particularly to an aircraft instrument for generating rate of climb information including the rate of vertical air movement outside of the aircraft, the best speed to fly information, and including a correction for climb induced by control motion.

2. Description of the Prior Art

In prior U.S. Pat. No. 3,451,265 issued to the inventor, a fast response rate of climb or sink meter was disclosed in which pressure responsive diaphragm members were used in a unique and novel combination to generate rate of climb information as well as to correct for the rate of climb which is attributable to operation of the aircraft controls. The rate of climb apparatus in the aforesaid patent may be used in an aircraft where it is important for the pilot to determine the rate of climb of the aircraft due to the vertical motion of the air outside of the aircraft.

The vertical motion of the air outside of the aircraft (termed NETTO) may be derived by subtracting the polar sink of the aircraft from the generated rate of climb information. In this vertical air or NETTO mode of operation, if the air motion is not moving or is smooth, the rate of climb meter would read zero. Such information is desirable for the operator of the aircraft (which is usually a glider) since it helps the operator locate a thermal condition and to steer into areas of least sink (i.e. the downward movement of the air). When flying fast, it is much easier to judge the thermal strength of moving air when the meter reads the vertical velocity of the air outside the craft directly instead of the sum of the air vertical velocity plus the aircraft rate of sink.

These two types of meter readings (i.e. rate of climb and NETTO) are discussed in the literature accompanying the various models of the above patented invention. See "Description and Instructions for Netto Optimum Cruise Control Options for Ball Variometers Models 100, 101, and 200" published by the Ball Engineering Company, 2140 Kohler Drive, Boulder, Colorado.

The above described instructions further disclose a cruise control system which provides the best speed to fly information to the operator of the aircraft. The output of the meter in this "cruise" mode provides a zero condition whenever the aircraft is in the most optimum conditions for movement, such as gliding. The operator need only control air speed to hold the meter needle on zero as he flies or cruises between thermals. If the meter reads up, the operator pulls back on the stick control while if the meter reads down, the operator pushes forward on the stick control.

In operation, the RATE OF CLIMB mode is used whenever it is desired to climb within a thermal since the absolute rate of climb is important especially near ground levels. To determine whether to continue climbing or to leave a thermal and to help compute performance while cruising a separate averaging indicator can be used to provide the average rate of climb or sink in a given time frame. However, when searching for a thermal, it is important to have the meter in the NETTO mode to read the rate the vertical air is moving. And finally, in order to minimize the fatigue of the operator and to allow for minimum concentration, once the climb has been made and the aircraft leaves the thermal, the CRUISE mode is used since all the operator need do is either slow or speed up the aircraft in order to be in the optimum flying conditions.

Numerous prior art patents have been issued on various devices for accurately measuring only the rate of change of aircraft movement. Such prior art approaches include the following issued patents:

W. Angst et al., U.S. Pat. No. 2,531,492 issued on Nov. 28, 1950;

Anastasia, U.S. Pat. No. 2,718,783 issued on Sept. 27, 1955;

Rusk, U.S. Pat. No. 2,931,221 issued on Apr. 5, 1960;

Summerlin, U.S. Pat. No. 2,970,471 issued on Feb. 7, 1961;

McLane, U.S. Pat. No. 3,055,214 issued on Sept. 25, 1962;

Escobosa, U.S. Pat. No. 3,196,691 issued on July 27, 1965;

Hattendorf, U.S. Pat. No. 3,276,255 issued on Oct. 4, 1966;

Feuer, U.S. Pat. No. 3,572,115 issued on Mar. 23, 1971;

Andresen, Jr., U.S. Pat. No. 3,683,690 issued on Aug. 15, 1972;

Bullard, Jr. et al., U.S. Pat. No. 3,703,828 issued on Nov. 28, 1972;

Kosakowski et al., U.S. Pat. No. 3,726,138 issued on Apr. 10, 1973;

Melsheimer, U.S. Pat. No. 3,789,661 issued on Feb. 5, 1974; and

Greene, U.S. Pat. No. 3,885,430 issued on May 27, 1975.

All of the above prior art patents relate to various design improvements in rate of climb meters primarily directed toward speed of response, accuracy or both features. The device taught by the Feuer patent utilizes a linear pressure transducer and the rate of climb signal is developed electronically by differentiating a static pressure signal and solving a specific equation. The rate of climb sensor taught by Kasakowski et al. teaches the use of a solid state pressure transducer to obtain the rate of climb signal from a digital pressure rate sensor system. The Schwartz apparatus utilizes two pressure sensitive transistors having applied thereto static outside pressure as well as a reference pressure in an air chamber.

In view of the foregoing, while rate of climb meters are known in the prior art and include the taking of the derivative of a developed electrical signal, as well as utilizing pressure sensitive transistors, there is no teaching in the prior art of the aircraft instrument of the present invention wherein a pair of absolute pressure transducers are used to sense both altitude change and airspeed change, combining these outputs, and then taking the derivative of the combined output in order to develop a single signal representative of the rate of climb. Furthermore, none of the above prior patented approaches teach the use of electronically determining the rate of vertical movement of air outside of the aircraft due to thermal conditions or of providing an indication of the best speed to fly conditions. In addition, an optional provision is made to the present invention to provide an average indication of the rate of climb.

OBJECTS OF THE INVENTION

It is an object of the present invention to provide a novel aircraft instrument responsive to altitude change and airspeed change for indicating the rate of climb of the aircraft.

It is another object of the present invention to provide a new and novel aircraft instrument responsive to altitude change and airspeed change for selectively indicating the rate of climb of the aircraft and the vertical air movement outside of the aircraft.

It is still another object of the present invention to provide a new and novel aircraft instrument responsive to altitude change for generating a first electrical signal and being responsive to airspeed change for generating a second electrical signal so that when the first and second electrical signals are combined the rate of climb of the aircraft caused by the vertical motion of the air can be indicated to the operator.

It is still another object of the present invention to provide a new and novel aircraft instrument responsive to altitude change for generating a first electrical signal and responsive to airspeed change for generating a second electrical signal so that when the first and second signals are combined the combined signal can be differentiated to provide the rate of climb of the aircraft and further indicating to the operator of the aircraft the vertical motion of the air by modifying the airspeed change signal to provide a signal representative of the polar sink of the aircraft and combining the polar sink signal with the rate of climb signal to produce a signal indicative of the vertical motion of the air outside of the aircraft.

It is still a further object of the present invention to provide an aircraft instrument having a first transducer responsive to the altitude change of the aircraft for generating and amplifying a first electrical signal, a second transducer responsive to the airspeed change of the aircraft for generating and amplifying a second electrical signal, a circuit for combining the two amplified signals and differentiating the resultant sum thereby representing the rate of climb of the aircraft, and means receptive of the rate of climb information for indicating the rate of climb to the operator of the aircraft.

SUMMARY OF THE INVENTION

The present invention comprises a durable, compact aircraft instrument capable of measuring the rate of climb of the aircraft irrespective of climb induced by control motions, the average of the rate of climb, the vertical movement of the air outside of the aircraft, and the best speed to fly the aircraft. An altitude sensor for measuring changes in pressure due to change of altitude develops an electrical signal proportional to the altitude change. An airspeed sensor develops an electrical signal proportional to the airspeed of the aircraft. The two electrical signals are combined and amplified before differentiation. The differentiated signal is representative of the rate of climb of the aircraft and is amplified to drive an indicator such as a meter. In an optional mode, the airspeed electrical signal is selectively attenuated and combined with the rate of climb signal to provide an amplified output indicative of the vertical motion of air outside of the aircraft. In yet another optional mode of operation, the differentiated signal is modified by a cruise control circuit which provides an output indication indicative of the best speed to fly the aircraft. The later information provides the optimum flying conditions to the operator of the aircraft. Finally, the rate of climb information may optionally be provided to an averaging electronic circuit to drive an output indicator for generating an average rate of climb signal.

The altitude and airspeed sensors are absolute pressure transducers of solid state design interconnected with a plurality of operational amplifiers interconnected as differentiators, averagers, and amplifiers to perform the above described features.

Other objects, advantages and capabilities of the present invention will become more apparent as the description proceeds taken in conjunction with the accompanying drawings.

GENERAL DESCRIPTION

Figure 1:
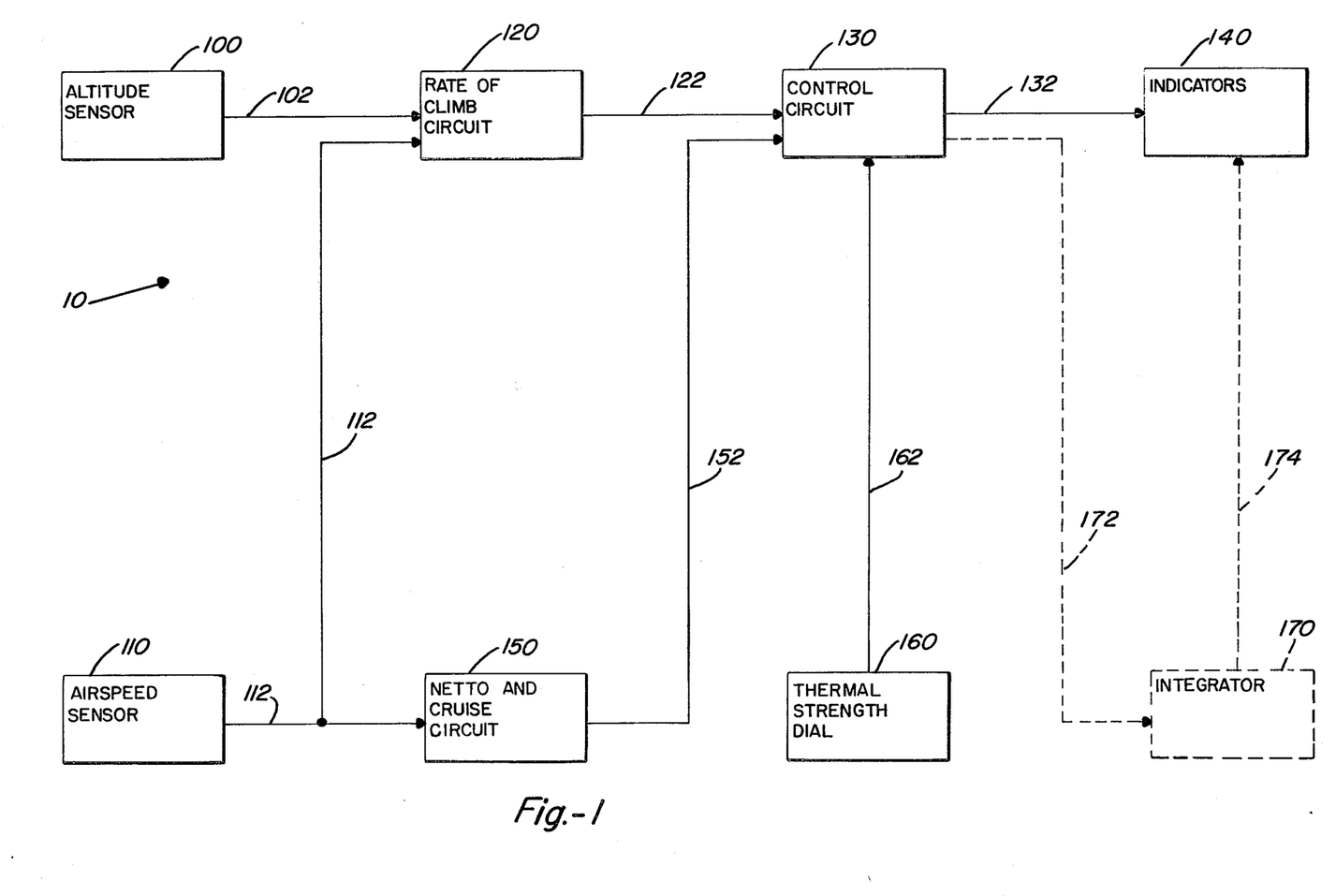
FIG. 1 is a diagrammatic illustration of the major components of the aircraft instrument of the present invention.

The aircraft instrument 10 of the present invention is shown in FIG. 1 to include an altitude sensor 100 responsive to pressure changes in altitude for generating an electrical signal over lead 102 representative of changes in altitude and an airspeed sensor 110 responsive to pressure changes in airspeed for generating an electrical signal on lead 112 proportional to changes in airspeed. A rate of climb circuit 120 is receptive of the altitude signals on lead 102 and of the airspeed signal on lead 112 for generating rate of climb information on lead 122 which is delivered into a control circuit 130 for subsequent delivery over lead 132 to indicators 140. The indicators 140, as will be discussed in the ensuing, may comprise any of a number of conventional indicating devices, such as meters, audio alarms, and the like. In this manner, the aircraft instrument of the present invention is responsive to changes in altitude and in airspeed for determining the rate of climb of the aircraft and for immediately displaying the result thereof.

Furthermore, the operator of the aircraft may desire to determine the velocity of the upward movement of air outside of the aircraft due to thermals. In this mode of operation, the aircraft instrument of the present invention provides a NETTO-cruise mode circuit 150 receptive of the change in airspeed electrical signal appearing on lead 112 for modifying the airspeed by taking into account the polar sink of the aircraft and placing it on lead 152. When the polar sink of the aircraft is subtracted from the rate of climb information, the result is the vertical velocity of the outside air due to the thermal condition of the air. The control circuit 130 upon receiving data appearing on lead 152 operates to modify the data appearing on lead 122 to generate on lead 132 the vertical motion of the air outside the aircraft. Any sink due to the aircraft is thereby automatically eliminated. The indicators 140, therefore, indicate only the vertical motion of the air due to thermal conditions. A thermal strength dial 160 is further provided to enable the operator of the aircraft to allow for the thermal strength of the next thermal as he is flying.

The Netto and Cruise circuit 150 is also capable of allowing the operator to selectively control the speed of the aircraft in order to fly under optimum conditions. The Netto and cruise circuit 150, when activated outputs a signal over lead 152 which is delivered into the control circuit 130. The control circuit 130 receptive of information on lead 152 and 122 provides the best speed to fly information on lead 132 to the indicators 140. The operator of the aircraft reads the indicator which shows zero for the best speed to fly conditions.

An integrator circuit 170 is provided to generate an average rate of climb signal during a predetermined time interval. The integrator circuit 170, therefore, receives rate of climb information over lead 172 from control circuit 130 and delivers an averaging signal over lead 174 to drive an appropriate indicator. The average rate of climb information is valuable to the operator to indicate total performance over a long period of time either climbing in a thermal or when descending at variable rates when cruising.

DETAILED SPECIFICATION

Figure 2:
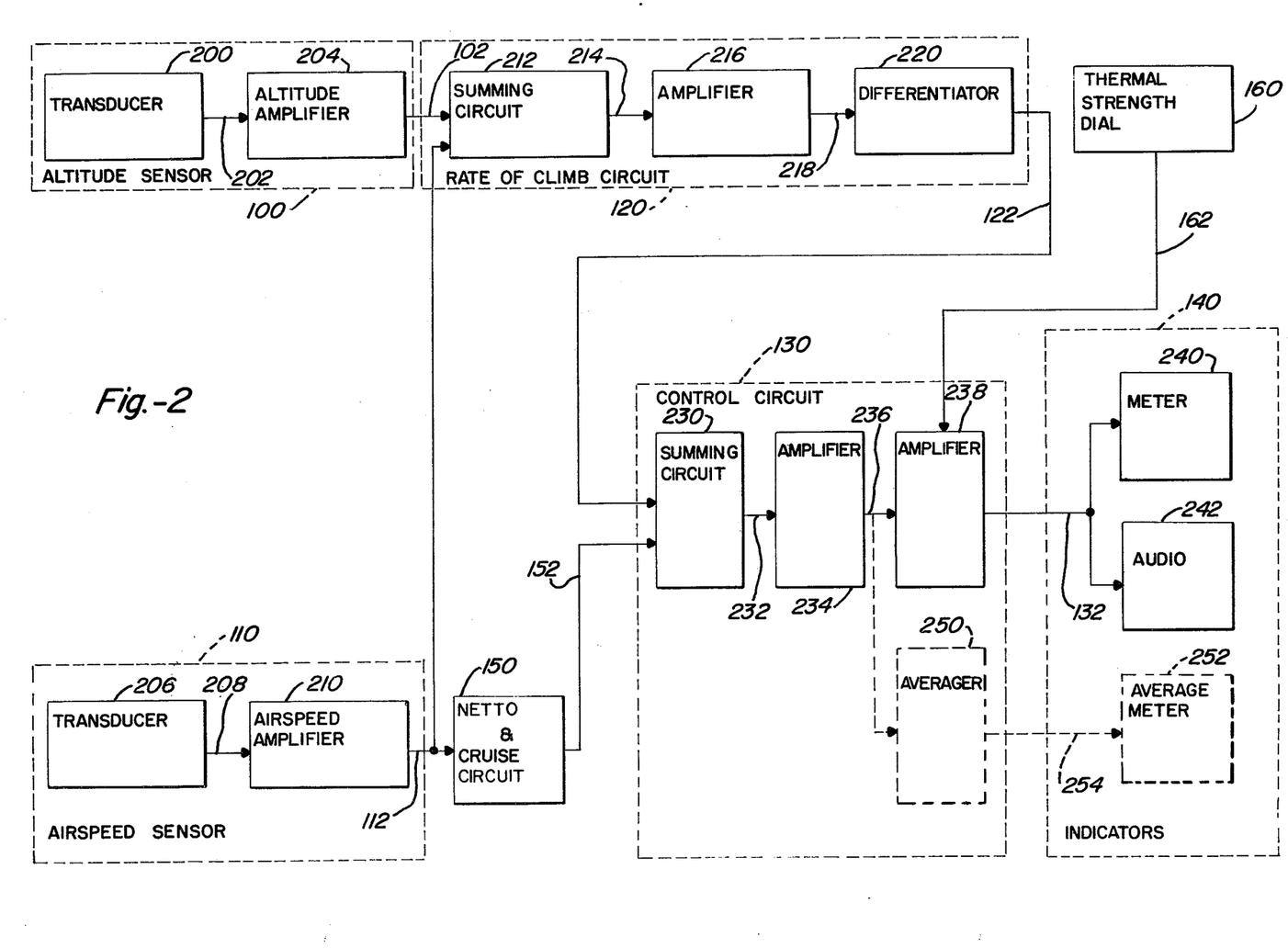
FIG. 2 is a block diagram of the preferred electronic circuitry of the aircraft instrument of the present invention.

The detailed block diagram showing the various components of the present invention 10 is shown in FIG. 2. The altitude sensor 100 includes an absolute pressure electrical transducer 200 responsive to changes in altitude pressure for generating an electric signal over lead 202 into an amplifier 204. The amplifier 204 amplifies the signal appearing on lead 202 and delivers it to lead 102. In a similar manner, the airspeed sensor 110 includes an airspeed transducer 206 responsive to changes in airspeed for delivering an electronic signal proportional to such changes on lead 208 into an amplifier circuit 210. The amplifier 210 amplifies the signal on 208 for delivery to lead 112. The absolute pressure transducers 202 and 206 are preferably those manufactured by National Semiconductor as Model Number LX1600A. The preferred transducer consists primarily of Wheatstone-Bridge arrangement of four piezo-resistors defused onto a silicon chip. Alternately a similar differential pressure sage may be used to sense airspeed.

The electrical output on lead 102 from the altitude amplifier 204 enters the rate of climb circuit 120, specifically a summing circuit 212. The summing circuit 212 also receives the electrical signal on lead 112 from the airspeed amplifier 210, combines that signal with the signal appearing on lead 102 and delivers the combined signal to lead 214 and into amplifier 216. The signal on lead 214 is now amplified and delivered to lead 218 for delivery into a differentiator 220. The signal appearing on lead 218 is electronically differentiated and appears on lead 122. The signal appearing on lead 122 is representative of the rate of climb of the aircraft.

The rate of climb information is now delivered into summing circuit 230 of the control circuit 130. The summing circuit 230 is also receptive of any signal that appears on lead 152 from the thermal and cruise modifier circuit 150. The summing circuit 230 combines the two signals appearing on leades 122 and 152 together for delivery over lead 232 into amplifying circuit 234.

The amplifying circuit 234 amplifies the signal on lead 232 and delivers it over lead 236 into a second amplifier circuit 238. Amplifier 238 is under control of the thermal strength dial 160 by signals appearing over lead 162. The output of amplifier 238 is delivered over lead 132 to the indicators 140. The indicators 140 may include a meter 240, audio indicator 242, and an averaging meter 252.

Optionally provided and shown as dotted lines in FIG. 2 is an averaging circuit 250 receptive of the output of amplifier 234 appearing on 236 for averaging the rate of climb signal and for delivery into an averaging meter 252 over lead 254.

In operation, the aircraft instrument 10 of the present invention is responsive to altitude and airspeed changes which are combined together by the summing circuit 212 and amplified by amplifier 216. The resultant information is representative of altitude change and airspeed change and is delivered into a differentiator 220. The differentiator 220 provides a time element to this information. By knowing the altitude change in a given period of time and the airspeed change in a given period of time, the rate of climb of the aircraft can be ascertained for delivery on lead 122. This rate of climb information is further delivered into a summing circuit 230 added to any signal on lead 152, the rate of climb information is delivered to lead 232, amplified first by amplifier 234 and then by amplifier 238. Summed with Netto or Cruise information from circuit 150 on lead 162, the amplified rate of climb information is delivered on lead 132 to meter 240. The rate of climb of the aircraft is thus visually displayed on meter 240 or may be audibly delivered through indicator 242.

If the operator of the aircraft selects to read out only the outside vertical air movement due to thermal motion of the air (i.e. the Netto mode), then the polar sink, in a manner which will be hereinafter discussed, must be subtracted from the rate of climb information. The polar sink of the aircraft is pre-determined in circuit 150 which varies with airspeed. The resultant polar sink of the aircraft appears on lead 152 and is delivered into the summing circuit 230 where it is subtracted from rate of climb information appearing on lead 122. The vertical motion information of the air outside now appears on lead 232 and is amplified by amplifiers 234 and 238 for delivery into the indicators 140. The operator by activating the Netto and Cruise circuit 150, therefore, can read directly the velocity of the outside vertical air.

In a manner to be more thoroughly discussed in the ensuing, if the operator of the aircraft appropriately activates the Netto cruise circuit 150 and the thermal strength dial 160, the rate of climb information appearing on lead 232 is modified to provide the best speed to fly information (i.e. Cruise), on lead 132 which is displayed in meter 240 or audibly indicated in audio circuit 242.

If the average rate of climb information is desired, that information is derived from the rate of climb information appearing on lead 236, integrated over a predetermined period of time by circuit 250 and displayed in meter 252.

Figure 3:
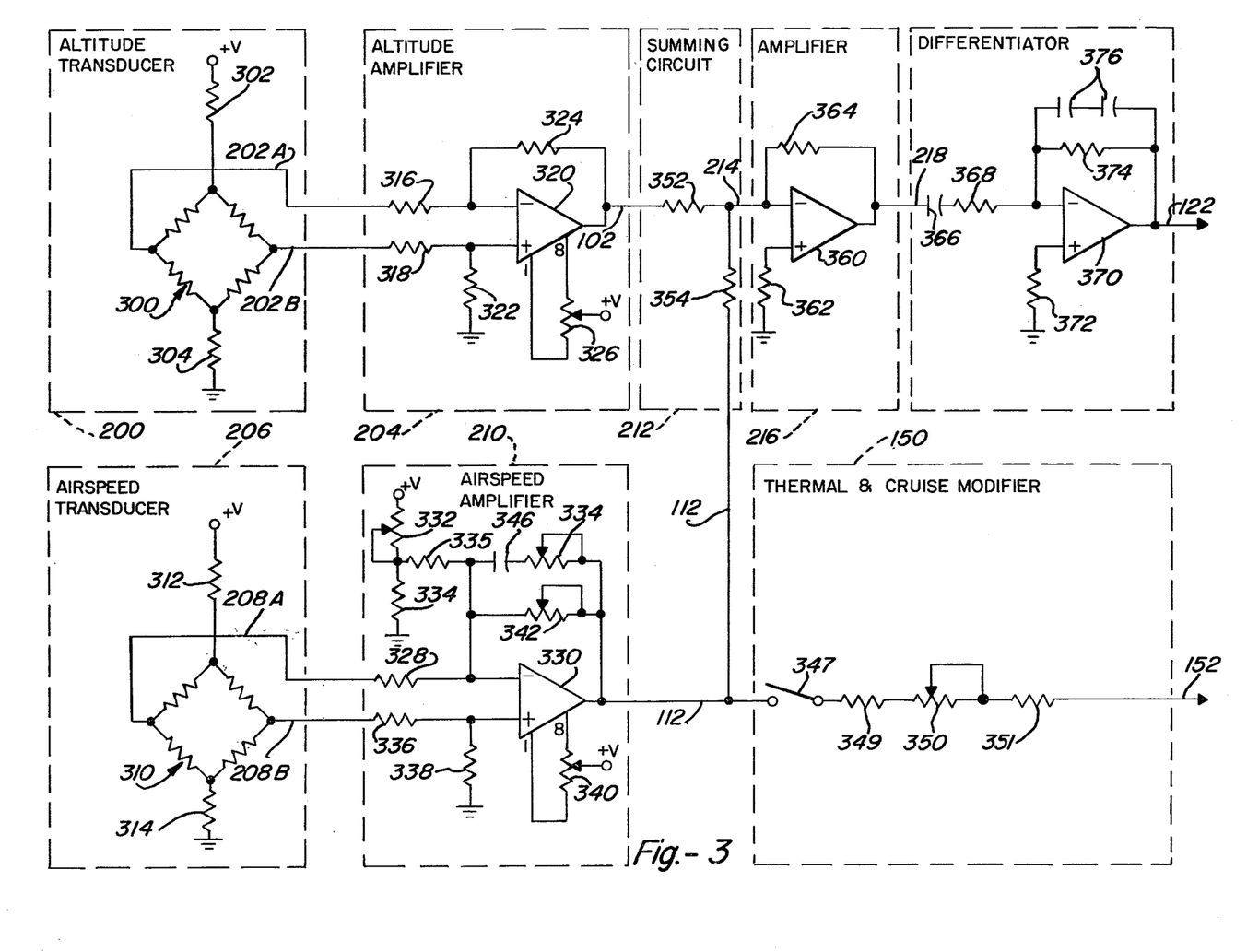
FIG. 3 is a detailed electronic schematic of one preferred embodiment of the portion of the aircraft instrument shown in FIG. 2.
Figure 4:
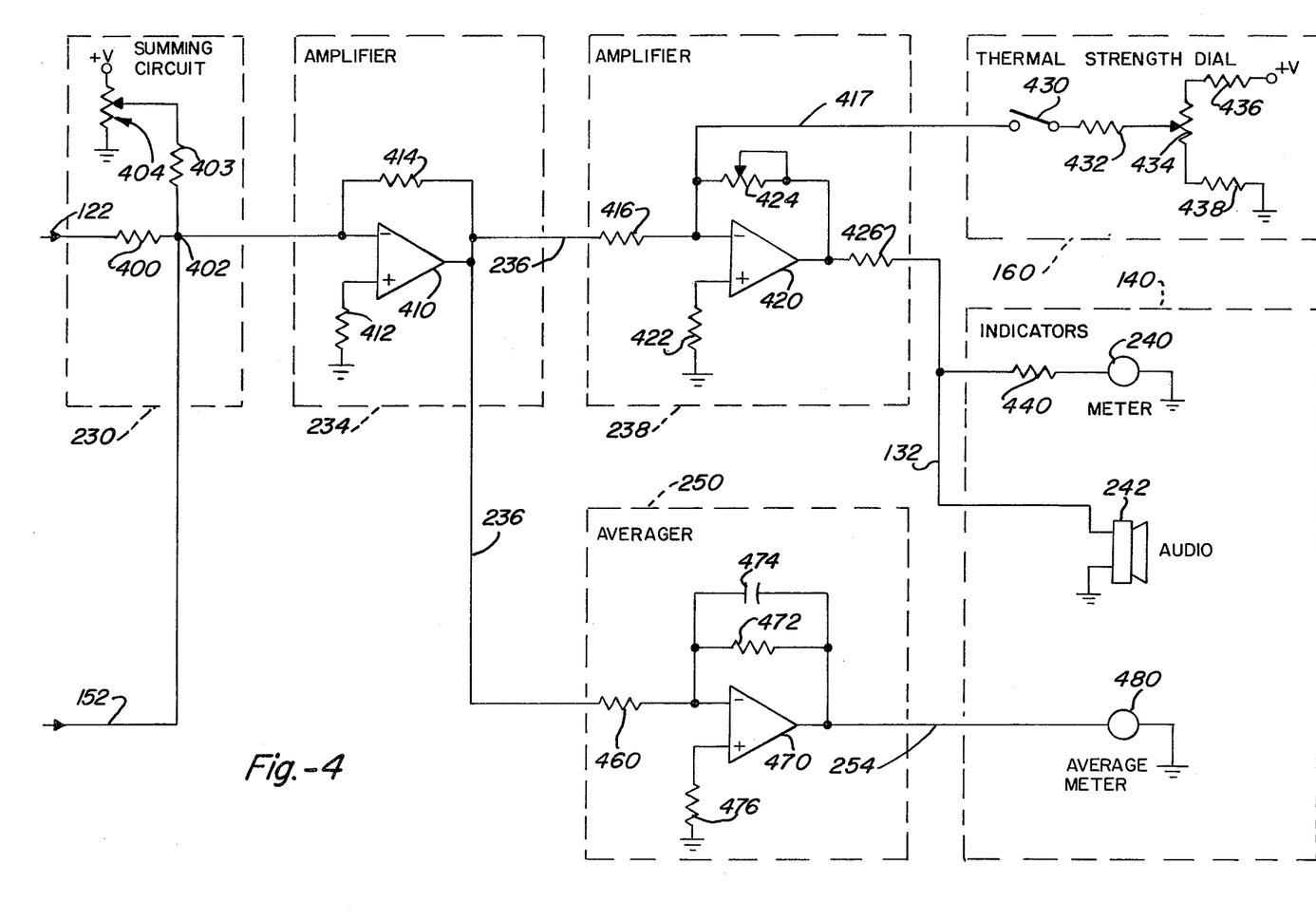
FIG. 4 is a detailed electronic schematic of the remaining circuitry of the aircraft instrument of FIG. 3.

The preferred electronic schematic of the aircraft instrument 10 of the present invention is shown in FIGS. 3 and 4. The altitude transducer 300 comprises the aforementioned Wheatstone-Bridge having one end biased through resistor 302 to positive voltage and the other end biased through resistor 304 to ground. The other two ends of Wheatstone-Bridge 300 are delivered over leads 202A and 202B respectively. Likewise, the airspeed transducer 310 has one end of the Wheatstone-Bridge biased through resistor 312 to positive voltage and the other opposing end biased through resistor 314 to ground. The two remaining ends of the Wheatstone-Bridge 310 are delivered over leads 208A and 208B.

The altitude amplifier 204 receives inputs 202A and 202B from the altitude transducer 200. Lead 202A is connected to resistor 316 and accesses the MINUS input of operational amplifier 320. Lead 202B accesses resistor 318 which is connected at the other end to the PLUS input of operational amplifier 320. The PLUS input is also interconnected with resistor 322 to ground. The output of the operational amplifier is delivered on lead 102 back through resistor 324 to the MINUS input. Pins 1 and 8 of the operational amplifier 320 are interconnected with potentiometer 326 of which the tap is biased to positive voltage. Operational amplifier 320 is preferably of the type known as LM312H-TO5.

The airspeed amplifier 210 is interconnected with the airspeed transducer 206 over leads 208A and 208B. Lead 208A accesses resistor 328 the other end of which is connected to the MINUS input of operational amplifier 330. Also connected to the MINUS input of operational amplifier 330 is the output of potentiometer 332 one end of which is connected to the MINUS input of amplifier 330 through resistor 335 and is further interconnected with resistor 334 to ground. The opposing end of potentiometer 332 is connected to PLUS voltage. Lead 208B is connected through resistor 336 to the PLUS input of amplifier 330 and is further connected through resistor 338 to ground. Pins 1 and 8 of amplifier 330 are interconnected through potentiometer 340 whose tap is interconnected with positive voltage. The output of amplifier 330 is delivered over lead 112 to the thermal and cruise modifier circuit 150 and is further delivered over lead 112 to potentiometers 342 and 344. The tap of potentiometer 342 is also connected to lead 112 and the other end of the potentiometer 342 is connected to the MINUS input of amplifier 330. The tap of potentiometer 344 is further connected to lead 112 and the other end of potentiometer 344 is interconnected with capacitor 346 and is delivered to the MINUS input of amplifier 330. The operational amplifier is preferably of the type known as LM312-H-TO5.

The thermal and cruise modifier circuit 150 receives an input from lead 112 which accesses potentiometer 350. The other end of potentiometer 350 is delivered over lead 152 into the summing circuit 230. Lead 152 is further interconnected with the tap of potentiometer 350.

The summing circuit 212 comprises a first resistor 352 receptive of the input over lead 102 and a second resistor 354 receptive of the information on lead 112. The outputs of the first and second resistors, 352 and 354 respectively, are interconnected to lead 214 to access the MINUS input of operational amplifier 360. The PLUS input of amplifier 360 is connected through resistor 362 to ground while the output of the amplifier 360 is fed back through resistor 364 to the MINUS input of amplifier 360. The output of amplifier 360 is delivered over lead 218 into the series combination of capacitor 366 and resistor 368 to the MINUS input of amplifier 370 of the differentiator circuit 220. The PLUS input of the amplifier 370 is delivered through resistor 372 to ground and the output of amplifier 370 is delivered over lead 122 through a resistor 374-capacitor 376 combination to the MINUS input of amplifier 370. Both operational amplifiers 360 and 370 are conventional, being preferably of the type known as LM312-H-TO5.

The preferred component values of the circuitry shown in FIG. 3 are as follows:
Resistor 316 — 10K ohms
Resistor 318 — 10K ohms
Resistor 322 — 10K ohms
Resistor 324 — 100K ohms
Resistor 336 — 10K ohms
Resistor 328 — 10K ohms
Resistor 334 — 3K ohms
Resistor 352 — 10K ohms
Resistor 354 — 10K ohms
Resistor 364 — 100K ohms
Resistor 362 — 10K ohms
Resistor 368 — 20K ohms
Resistor 372 — 10K ohms
Resistor 374 — 200K ohms
Potentiometer 326 — 100K ohms
Potentiometer 332 — 3K ohms
Potentiometer 340 — 100K ohms
Potentiometer 342 — 100K ohms
Capacitor 366 — 0.5 mfd
Capacitor 376 — 10 mfd In FIG. 4 are shown the details of the preferred electronic embodiment of the remaining circuitry of the aircraft instrument 10 of the present invention. The summing circuit 230 receives an input from the differentiator 220 over lead 122 which accesses resistor 400. The output of resistor 400 is delivered to node 402. The summing circuit 230 also receives an input from the thermal-cruise modifier circuit 150 over lead 152 which is directly interconnected with node 402. Finally, node 402 is interconnected to the tap of potentiometer 404 which has one end connected to positive voltage and the remaining end grounded. Node 402 is delivered into the MINUS input of amplifier 410 of the amplifier circuit 234. The PLUS input to amplifier 410 is delivered through resistor 412 to ground and the output of the amplifier 410 is delivered over lead 236 back through resistor 414 to the positive input of amplifier 410. Lead 236 is also delivered into resistor 416 and thence to the MINUS input of operational amplifier 420 of the amplifier circuit 238. The MINUS input of amplifier 420 is delivered through resistor 422 to ground and the output of amplifier 420 is delivered through potentiometer 424 to the MINUS input of amplifier 420. The tap of potentiometer 424 is also connected to the output of the amplifier 420. The output of amplifier 420 is further interconnected through resistor 426 to the various indicators 140. The MINUS input of amplifier 420 is further interconnected to the thermal strength dial 160. Specifically, the MINUS input to the amplifier 420 is delivered through switch 430 the other end of which is interconnected through resistor 432 to the tap of potentiometer 434. One end of potentiometer 434 is delivered through resistor 436 to positive voltage. The other end of potentiometer 434 is delivered through resistor 438 to ground. The operational amplifiers are preferably of the type known as LM324.

As mentioned, the output of amplifier 420 is delivered through resistor 426 to lead 132 and thence through resistor 440 to meter 240 and thence to ground. The output of resistor 426 is also delivered over lead 132 through the audio indicator 242 to ground.

The output of amplifier 410 is delivered over lead 236 to the averaging circuit 250. The output of the operational amplifier 470 is delivered back through a parallel resistor 472-capacitor 474 combination to the MINUS input of the amplifier 470. The PLUS input of the amplifier 470 is delivered through resistor 476 to ground. The output of the amplifier 470 is delivered through resistor 476 to ground. The output of the amplifier is delivered over lead 254 into an averaging meter 480 thence to ground. The preferred components with the circuitry shown in FIG. 4 are:

Resistor 400 — 10K ohms
Resistor 412 — 10K ohms
Resistor 414 — 10K ohms
Resistor 416 — 10K ohms
Resistor 422 — 10K ohms
Potentiometer 404 — 100K ohms
Potentiometer 424 — 100K ohms As previously discussed, prior art approaches generate rate of climb information by taking only the derivative of the altitude. This derivative information is then used to drive an indicator showing the rate of climb of the aircraft. Unfortunately, absolute pressure decreases with altitude and, for example, at 22,000 feet, such a rate of climb meter would read only 500 for a true rate of climb of 1000 fpm.

A more desirable approach would be to measure both the altitude pressure (i.e., the static pressure) and airspeed pressure (i.e., pitot pressure) since both are proportional to air density. The mathematical equation describing the physical operation may be described as follows:

[A] Modified Rate of Climb $= d/dt[2P_A - P_S]$

[B] $= d/dt[2p - (p + pV^2/2g)]$

[C] $= d/dt[p - pV^2/2g]$

[D] $= dp/dt - [d/dt(pV^2/2g)]$ where $P_A$ = altitude pressure (i.e., static pressure) = $2p$
$P_S$ = air speed pressure (i.e., pitot pressure) = $p + pV^2/2g$
$p$ = density
$V$ = velocity
$g$ = gravity
$t$ = time in seconds In equation [D], $dp/dt$ is representative of conventional rate of climb indicators. By subtracting $d/dt(pV^2/2g)$ the climb due to control motions is eliminated and the resulting "modified" rate of climb is a modified rate of climb of the aircraft taking into account the climb due to control motions.

In this invention the aforementioned decrease of gain with increasing altitude is used to advantage because BOTH the altitude and the airspeed transducers decrease their output with increasing altitude. Therefore, at any altitude the ratio of the altitude gain to the airspeed gain remains constant and the compensation for climb induced by aircraft control motion is accurate at all altitudes. For example, if the aircraft is, at a given instant, not gaining altitude, but flying at a given speed, the meter would read a "negative" value indicating to the operator that he will be losing altitude due to polar sink.

In the aircraft instrument of the present invention the static and pitot pressures measure an absolute pressure referenced against a vacuum since the transducers are absolute pressure transducers. The output, therefore, of the altitude transducer 200, on leads 202A and 202B, is representative of $p$, and the output of the altitude amplifier 204 on lead 102 is representative of $2Kp$, where $2K$ is equal to an amplifying constant. Likewise, the output of the airspeed transducer 206 on leads 208A and 208B corresponds to $p + pV^2/2g$ and that value is amplified by the airspeed amplifier 210 so that the value of $K(p + pV^2/2g)$ appears on the lead 112. The transducer signals are then combined in the summing circuit 212 and to represent $K[p - pV^2/g]$ on lead 214. This value is then amplified and differentiated so that on lead 122 the derivative of the combined altitude and airspeed signals is provided as $d/dt[k(p - pV^2/2g)]$ which is the desired rate of indicated climb. By changing the gain used it is alternately possible to use a differential airspeed transducer.

When the options, i.e., the thermal-cruise modifying circuit 150 and the thermal strength dial 160 are not activated, the indicated rate of climb signal is delivered into amplifiers 234 and 238 for driving the indicators 240 and 242. In addition, the indicated rate of climb function may be integrated over a predetermined period of time as determined by the time constant of resistor 427-capacitor 474 combination and displayed in the averaging meter 480.

Figure 7:
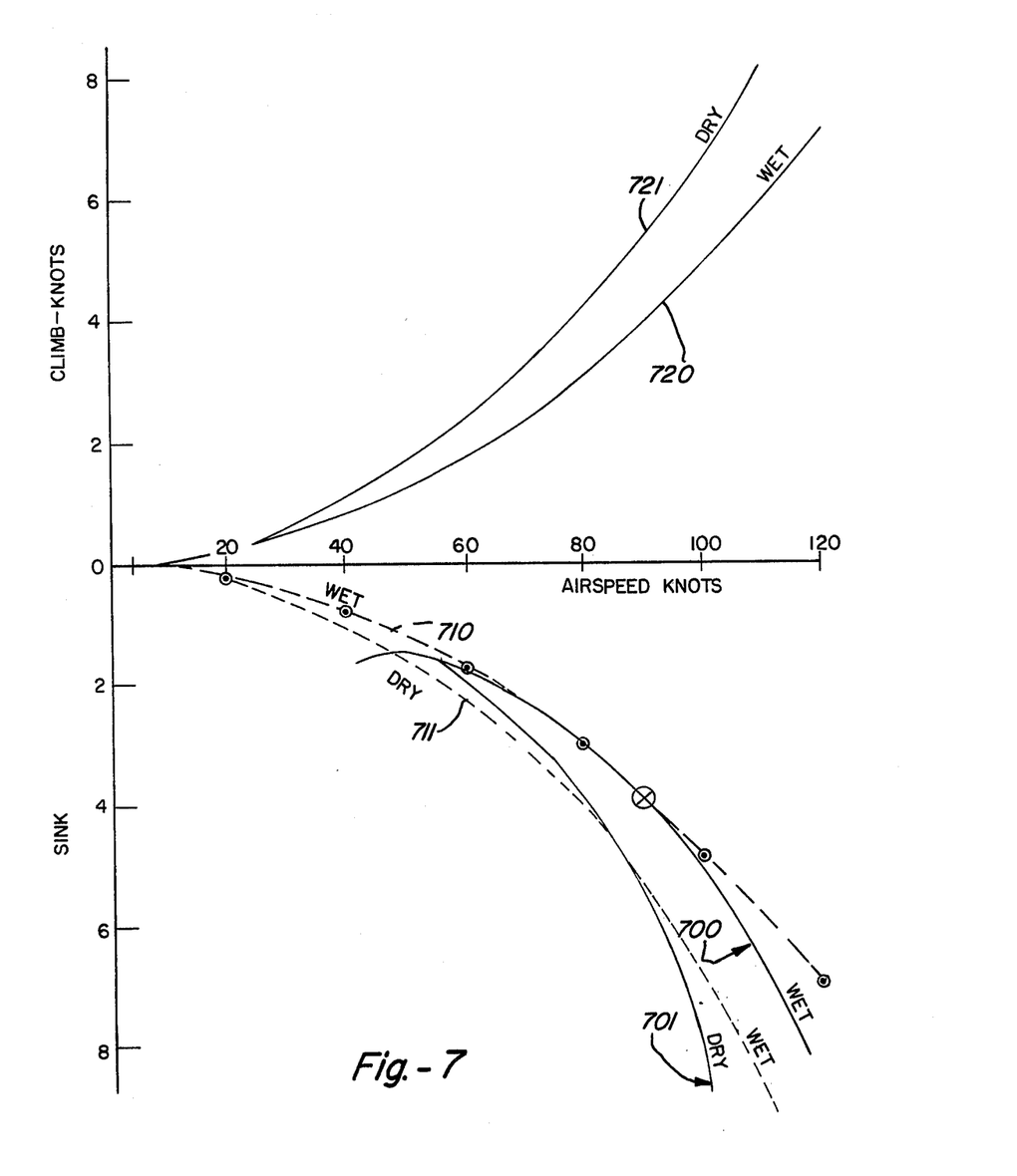
FIG. 7 is a graphical computation of the "polar sink" of the aircraft.

Before discussing the means for measuring the vertical movement of air outside the aircraft due to thermal conditions and the best-speed-to-fly option, it is first necessary to discuss briefly the aircraft performance function appearing in FIG. 7. The polar sink curve for a standard sailplane is shown in FIG. 7 as curve 700. Curve 700 is approximated to zero by curve 710, and represents the theoretical polar sink curve. Curve 720 represents the mirror image of curve 710 and if a signal representing curve 720 is added into the rate of climb signal, the expected solar sink of the aircraft is compensated for and the true vertical movement of the air is determined.

Since the output of the airspeed transducer 206 is substantially proportional to the square of the airspeed, that output corresponds to curve 720. Therefore, the airspeed signal is delivered on lead 112, passes through the thermocruise modifier circuit 150 and lead 152. The signal appearing on lead 152, when switch 347 is closed, is added to the rate of climb information appearing on leads 122 and the summing circuit 230. The result is that if the velocity of the outside air is smooth (i.e., the vertical velocity of the air is substantially zero), then the indicator will read approximately zero. It is to be understood that this is an approximation, but that it is close enough for all practical purposes.

Figure 5:
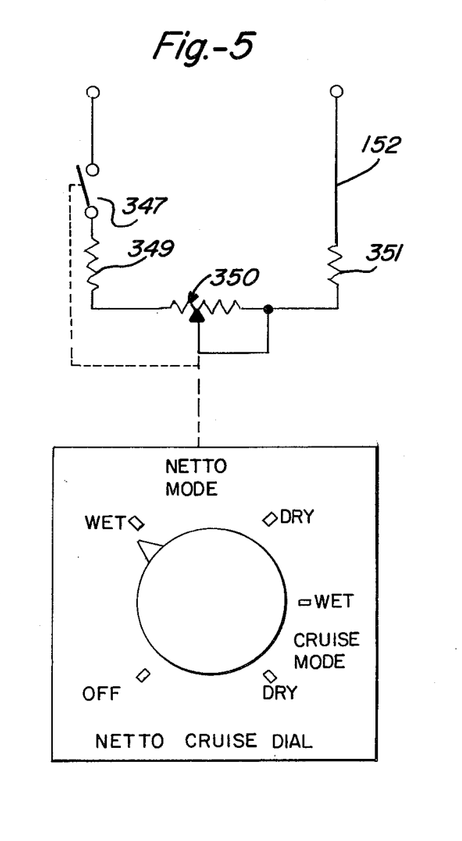
FIG. 5 is a diagrammatic illustration of the NETTO-cruise dial and related electronic circuitry.

Details of the Netto-Cruise circuit 150 are shown in FIG. 5. When the operator of the aircraft closes switch 347, a compensating value is added to the rate of climb information to compensate for the polar sink of the aircraft, thereby providing the vertical motion of the air information to the indicator 240. If the aircraft is a sailplane, additional consideration must be made for whether the sailplane is flying wet or dry. Conventional sailplanes have water tanks on the wings in order to increase the speed. When poor thermals are encountered, the water is dumped and the sailplane is glided in a dry condition. Whether the sailplane is flying wet or dry affects its polar sink curve wet 700, or dry 701, shown in FIG. 7. The purpose of potentiometer 350 is to compensate for the different polar sink characteristics of the aircraft by selectively attenuating the airspeed signal. Of course, the appropriate settings for wet and dry in potentiometer 350 are primarily a function of the weight and performance of the sailplane.

Figure 8:
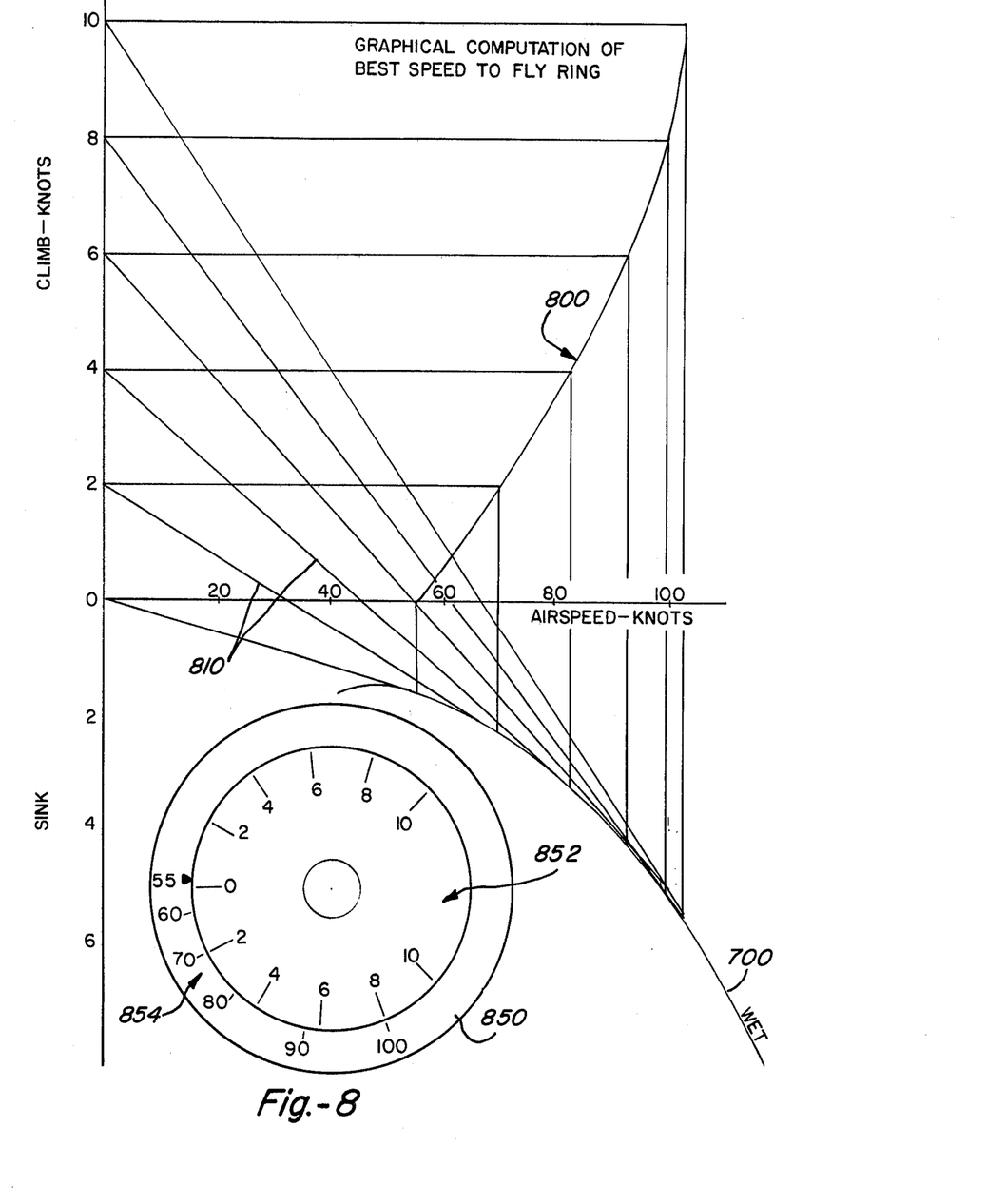
FIG. 8 is the graphical computation of the best-speed-to-fly.

The best-speed-to-fly function (i.e. the cruise mode) is described in FIG. 8, wherein the polar sink curve 700 of a wet aircraft is repeated. A best-speed-to-fly Curve 800 is generated graphically in FIG. 8 by taking tangents 810 from the assumed air sinking speeds of the aircraft polar sink curve 700. A best-speed-to-fly curve, 800, is then generated as illustrated. The principle is the same as discussed above except that now the sinking speed of the air is used rather than the sinking speed of the air plus the sinking speed of the aircraft. Conventionally a circular slide rule 850 is used (shown in FIG. 8) to determine which speed the aircraft should be flown based on an expected thermal strength. The expected thermal strength is shown on the inner dial 852 and the speed at which to fly shown on the outer dial 854. The thermal strength dial 160 when activated by switch 430 merely shifts the reference point of the indicator in much the same manner as rotating the circular calculator 850 and completely eliminates the need of the slide rule which is conventionally used.

Figure 6:
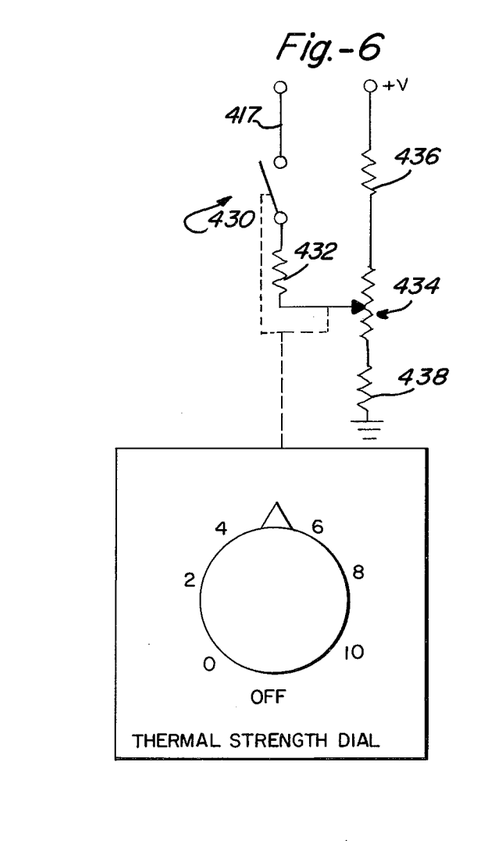
FIG. 6 is a diagrammatic illustration of the thermal strength dial and related electronic circuitry.

Therefore, when the cruise option is selected, the thermal cruise modifier 150 as shown in FIG. 5 is set either to cruise "wet" or "dry" and the thermal strength dial shown in FIG. 6 is set to the expected thermal strength of the next thermal. The thermal strength of the next thermal is generally equal to the thermal rate of the prior thermal. The operator of the aircraft need only control the airspeed of the aircraft by holding the needle of meter 240 on zero as he cruises between thermals. The audio indicator 242 may be set to fly at the optimum speed by listening to the audio tone which is steady below and intermittant above zero.

The theory of both the vertical movement of the air and of the cruise control option is discussed in the above-referenced "Description and Instruction for Netto and Optimum Cruise Control Options for All Variometers Models 100, 101 and 200."

Although the present invention has been described with a certain degree of particularity, it is understood that the present disclosure has been made by way of example, and that changes in details of structure may be made without departing from the spirit thereof.

I claim:

1. An aircraft instrument comprising:
   means responsive to the altitude change of said aircraft for generating a first electrical signal, said first signal being proportional to said altitude change,
   means responsive to the airspeed change of said aircraft for generating a second electrical signal, said second signal being proportional to said airspeed change, and
   means operative upon receipt of said first and second signals for indicating a modified rate of climb of said aircraft, said modified rate of climb signal being representative of the true rate of climb of said aircraft less the rate of climb due to control motions of said aircraft.

2. The aircraft instrument of claim 1 further comprising:
   means operative upon receipt of said first and second signals for indicating the rate of vertical air movement outside of said aircraft.

3. The aircraft of claim 1 further comprising:
   means operative upon receipt of said first and second signals for indicating the best speed to fly condition of said aircraft.

4. The aircraft of claim 1 further comprising:
   means operative upon receipt of said first and second signals for indicating an average of said modified rate of climb signal.

5. An aircraft instrument comprising:
   means responsive to the altitude change of said aircraft for generating a first electrical signal, said first signal being proportional to said altitude change,
   means responsive to the airspeed change of said aircraft for generating a second electrical signal, said second signal being proportional to said airspeed change,
   first means operative upon receipt of said first and second signals for selectively indicating a modified rate of climb of said aircraft, said modified rate of climb signal being representative of the true rate of climb of said aircraft less the rate of climb due to control motions of said aircraft, and
   second means operative upon receipt of said first and second signals for selectively indicating the rate of vertical air movement outside of said aircraft.

6. The aircraft instrument of claim 5 further comprising:
   third means operative upon receipt of said first and second signals for selectively indicating the best speed to fly condition.

7. The aircraft instrument of claim 5 further comprising:
   fourth means operative upon receipt of said first and second signals for selectively indicating an average of said modified rate of climb signal.

8. An aircraft instrument comprising:
   means responsive to the altitude change of said aircraft for generating a first electrical signal, said first signal being proportional to said altitude change,
   means responsive to the airspeed change of said aircraft for generating a second electrical signal, said second signal being proportional to said airspeed change,
   means receptive of said first and second signals for combining said second signal with said first signal,
   means operative upon said combined signal for differentiating said combined signal, said differentiated signal being proportional to a modified rate of climb of said aircraft, said modified rate of climb signal being representative of the true rate of climb of said aircraft less the rate of climb due to control motions of said aircraft, and
   means activated by said rate of climb signal for indicating said modified rate of climb to the operator of said aircraft.

9. The aircraft instrument of claim 8 further comprising:
   means receptive of said second signal for generating a signal proportional to the polar sink of said aircraft,
   means receptive of said modified rate of climb signal and of said polar sink signal for generating a signal representative of the vertical motion of the air outside of said aircraft, and
   means operative upon said vertical motion signal for indicating to the operator said vertical motion.

10. The aircraft of claim 8 further comprising:
    means operative upon said modified rate of climb signal for generating a signal representative of the best speed to fly condition, and
    means receptive of said best speed to fly signal for indicating to the operator said best fly condition.

11. The aircraft of claim 8 further comprising:

means operative upon said modified rate of climb signal for generating a signal representative of the average modified rate of climb of said aircraft, and means receptive of said average modified rate of climb signal for indicating said average modified rate of climb.

12. An aircraft instrument comprising:

means responsive to the altitude change of said aircraft for generating a first electrical signal, said first signal being proportional to said altitude change, means responsive to the air speed change of said aircraft for generating a second electrical signal, said second signal being proportional to said airspeed change, means receptive of said first and second signals for combining said second signal with said first signal, means operative upon said combined signal for differentiating said combined signal, said differentiated signal being proportional to a modified rate of climb of said aircraft, said modified rate of climb signal being representative of the true rate of climb of said aircraft less the rate of climb due to control motions of said aircraft, means activated by said modified rate of climb signal for selectively indicating the modified rate of climb to the operator of said aircraft, means receptive of said second signal for generating a signal representative of the polar sink of said aircraft, means receptive of said modified rate of climb signal and of said polar sink signal for generating a signal representative of the vertical motion of the air outside of said aircraft, and means operative upon said vertical motion signal for selectively indicating to the operator said vertical motion.

13. The aircraft instrument of claim 12 further comprising:

means operative upon said modified rate of climb signal for generating a signal representative of the best speed to fly condition, and means receptive of said best speed to fly signal for indicating to said operator said best speed to fly condition.

14. An aircraft instrument, said instrument comprising:

a first transducer responsive to the altitude change of said aircraft for generating an electrical signal representative of said altitude change, means receptive of said altitude change electrical signal for amplifying said signal, a second transducer responsive to the airspeed change of said aircraft for generating an electrical signal representative of said airspeed change, means receptive of said airspeed change electrical signal for amplifying said signal, means operative upon said altitude change electrical signal and of said airspeed change electrical for combining said airspeed change signal with said altitude change signal, means operative upon said combined signal for amplifying said combined signal, means receptive of said amplified combined signal for differentiating said amplified combined signal, said differentiated signal being representative of a modified rate of climb of said aircraft, said modified rate of climb signal being representative of the true rate of climb of said aircraft less the rate of climb due to control motions of said aircraft, means operative upon said modified rate of climb signal for amplifying said modified rate of climb signal, and means receptive of said amplified modified rate of climb signal for indicating said modified rate of climb of said aircraft.

15. The aircraft instrument of claim 14 wherein said indicating means is a meter.

16. The aircraft instrument of claim 14 wherein said indicating means is an audio speaker.

17. The aircraft instrument of claim 14 further comprising:

means receptive of said airspeed change electrical signal for attenuating said airspeed change signal, said attenuating signal being representative of the polar sink of said aircraft, means operative upon said attenuated signal for combining said attenuated signal with said modified rate of climb signal, said aforesaid combined signal being representative of the vertical movement of air outside of said aircraft, means operative upon said vertical air movement signal for amplifying said vertical air movement signal, and means receptive of said amplified vertical air movement signal for selectively indicating vertical air movement outside of said aircraft.

18. The aircraft instrument of claim 14 in which said first and second transducers comprise absolute pressure transducers.

19. The aircraft instrument of claim 14 in which the first altitude transducer comprises an absolute pressure transducer and the second airspeed transducer comprises a differential pressure transducer.

* * * * *